(12) United States Patent
Kato

(10) Patent No.: US 7,760,990 B2
(45) Date of Patent: *Jul. 20, 2010

(54) RECORDING APPARATUS, RECORDING METHOD, PLAYBACK APPARATUS, PLAYBACK METHOD AND RECORDING MEDIA, INCLUDING RECORDED LIST OF RANDOM ACCESS POINTS

(75) Inventor: Motoki Kato, Kanagawa (JP)

(73) Assignee: Sony Corporation, Tokyo (JP)

( * ) Notice: Subject to any disclaimer, the term of this patent is extended or adjusted under 35 U.S.C. 154(b) by 1294 days.

This patent is subject to a terminal disclaimer.

(21) Appl. No.: 11/186,309

(22) Filed: Jul. 21, 2005

(65) Prior Publication Data

US 2005/0254798 A1 Nov. 17, 2005

Related U.S. Application Data

(63) Continuation of application No. 09/526,192, filed on Mar. 15, 2000, now Pat. No. 6,993,248.

(30) Foreign Application Priority Data

Mar. 19, 1999 (JP) .................................. 11-076148
Nov. 9, 1999 (JP) .................................. 11-317738

(51) Int. Cl.
*H04N 5/76* (2006.01)

(52) U.S. Cl. ...................... 386/109; 386/124

(58) Field of Classification Search ................... 386/69, 386/70, 92, 95, 108, 124–126, 109
See application file for complete search history.

(56) References Cited

U.S. PATENT DOCUMENTS

| | | | |
|---|---|---|---|
| 5,428,393 | A | 6/1995 | Enokida |
| 5,517,250 | A | 5/1996 | Hoogenboom et al. |
| 5,568,274 | A | 10/1996 | Fujinami et al. |
| 5,596,581 | A | 1/1997 | Saejis et al. |
| 5,602,956 | A | 2/1997 | Suzuki et al. |
| 5,621,840 | A | 4/1997 | Kawamura et al. |
| 5,719,982 | A | 2/1998 | Kawamura et al. |
| 5,844,478 | A | 12/1998 | Blatter et al. |
| 5,881,203 | A | 3/1999 | Fujinami et al. |
| 6,192,189 | B1 | 2/2001 | Fujinami et al. |
| 6,198,877 | B1 | 3/2001 | Kawamura et al. |
| 6,337,880 | B1 | 1/2002 | Cornog et al. |
| 6,442,334 | B1 | 8/2002 | Kawamura et al. |
| 6,535,688 | B1 | 3/2003 | Kawamura et al. |

(Continued)

FOREIGN PATENT DOCUMENTS

CN 96113328.7 6/1997

(Continued)

*Primary Examiner*—David E Harvey
(74) *Attorney, Agent, or Firm*—Oblon, Spivak, McClelland, Maier & Neustadt, L.L.P.

(57) ABSTRACT

A recording apparatus for recording a data stream including one or more packetized video streams, comprising a detector for detecting a random-access point of the data stream and an apparatus for obtaining and address of the random-access point. A packet including an address is distinguished according to a packet identification information. A data base is created including the address and the packet identification information. The data base is recorded separately form the data stream on a recording medium.

8 Claims, 15 Drawing Sheets

U.S. PATENT DOCUMENTS

| | | |
|---|---|---|
| 6,584,277 B2 | 6/2003 | Tsumagari et al. |
| 6,993,248 B1 * | 1/2006 | Kato .......................... 386/69 |
| 7,076,153 B2 * | 7/2006 | Ando et al. ................... 386/95 |
| 7,356,247 B2 * | 4/2008 | Hamasaka et al. ............ 386/95 |

FOREIGN PATENT DOCUMENTS

| | | |
|---|---|---|
| EP | 0 602 943 | 6/1994 |
| EP | 0 676 756 | 10/1995 |
| EP | 0 756 281 | 1/1997 |
| JP | 08-140043 | 5/1996 |
| JP | 08-168042 | 6/1996 |
| JP | 08-235832 | 9/1996 |
| JP | 8287473 | 11/1996 |

\* cited by examiner

| SYNTAX | NO. OF BITS | MNEMONIC |
|---|---|---|
| TRANSPORT_PACKET () { | | |
|   SYNC_BYTE | 8 | BSLBF |
|   TRANSPORT_ERROR_INDICATOR | 1 | BSLBF |
|   PAYLOAD_UNIT_START_INDICATOR | 1 | BSLBF |
|   TRANSPORT_PRIORITY | 1 | BSLBF |
|   PID | 13 | UIMSBF |
|   TRANSPORT_SCRAMBLING_CONTROL | 2 | BSLBF |
|   ADAPTION_FIELD_CONTROL | 2 | BSLBF |
|   CONTINUTIY_COUNTER | 4 | UIMSBF |
|   IF(ADAPTION_FIELD_CONTROL='10' \|\| | | |
| ADAPTION_FIELD_CONTROL='11') { | | |
|     ADAPTION_FIELD() | | |
|   } | | |
|   IF (ADAPTATION_FIELD_CONTROL='01' \|\| ADAPTION_FIELD_CONTROL='11') { | | |
|     FOR (I=0; I<N; I++) { | | |
|       DATA_BYTE | 8 | BSLBF |
|     } | | |
|   } | | |
| } | | |

FIG. 2

| SYNTAX | NO. OF BITS MNEMONIC |
|---|---|
| ADAPTION_FIELD 0 { | |
| ADAPTION_FIELD_LENGTH | 8 UNISBF |
|     IF (ADAPTION_FIELD_LENGTH>0) { | 1 BSLBF |
|         DISCONTINUITY_INDICATOR | 1 BSLBF |
|         RANDOM_ACCESS_INDICATOR | 1 BSLBF |
|         ELEMENTARY_STREAM_PRIORITY_INDICATOR | 1 BSLBF |
|         PCR_FLAG | 1 BSLBF |
|         OPCR_FLAG | 1 BSLBF |
|         SPLICING_POINT_FLAG | 1 BSLBF |
|         TRANSPORT_PRIVATE_DATA_FLAG | 1 BSLBF |
|         ADAPTION_FIELD_EXTENSION_FLAG | |
|         IF (PCR_FLAG = '1') { | |
|             PROGRAM_CLOCK_REFERENCE_BASE | 33 UIMSBF |
|             RESERVED | 6 BSLBF |
|             PROGRAM_CLOCK_REFERENCE_EXTENSION | 9 UIMSBF |
|         } | |
|         IF (OPCR_FLAG = '1') { | |
|             ORIGINAL_PROGRAM_CLOCK_REFERENCE_BASE | 33 UIMSBF |
|             RESERVED | 6 BSLBF |
|             ORIGINAL_PROGRAM_CLOCK_REFERENCE_EXTENSION | 9 UIMSBF |
|         } | |
|         IF (SPLICING_POINT_FLAG = '1') { | 8 TCIMSBF |
|             SPLICE_COUNTDOWN | |
|         } | |
|         IF (TRANSPORT_PRIVATE_DATA_FLAG = '1') { | 8 UIMSBF |
|             TRANSPORT_PRIVATE_DATA_LENGTH | |
|             FOR ( i=0: i<TRANSPORT_PRIVATE_DATA_LENGTH: i++) { | 8 BSLBF |
|                 PRIVATE_DATA_BYTE | |
|             { | |
|         } | |
|         IF (ADAPTION_FIELD_EXTENSION_FLAG = '1') { | 8 UIMSBF |
|             ADAPTION_FIELD_EXTENSION_LENGTH | 1 BSLBF |
|             ITW_FLAG | 1 BSLBF |
|             PIECEWISE_RATE_FLAG | 1 BSLBF |
|             SEAMLESS_SPLICE_FLAG | 5 BSLBF |
|             RESERVED | |
|             IF (ITW_FLAG = '1') { | |
|                 ITW_VALID_FLAG | 1 BSLBF |
|                 ITW_OFFSET | 15 UMISBF |
|             } | |
|             IF (PIECEWISE_RATE_FLAG = '1') { | |
|                 RESERVED | 2 BSLBF |
|                 PIECEWISE_RATE | 22 UMISBF |
|             } | |
|             IF (SIEMLESS_SPLICE_FLAG = '1') { | |
|                 SPLICE_TYPE | 4 BSLBF |
|                 DTS_NEXT_AU[32..30] | 3 BSLBF |
|                 MARKET_BIT | 1 BSLBF |
|                 DTS_NEXT_AU[29..15} | 15 BSLBF |
|                 MARKET_BIT | 1 BSLBF |
|                 DTS_NEXT_AU[14..0] | 15 BSLBF |
|                 MARKET_BIT | 1 BSLBF |
|             } | |
|             FOR (i=0: i<N: i++) { | |
|                 RESERVED | 8 BSLBF |
|             } | |
|         } | |
|         FOR (i=0: i<N: i++) { | |
|             STUFFING_BYTE | 8 BSLBF |
|         } | |
|     } | |
| } | |

*FIG. 3*

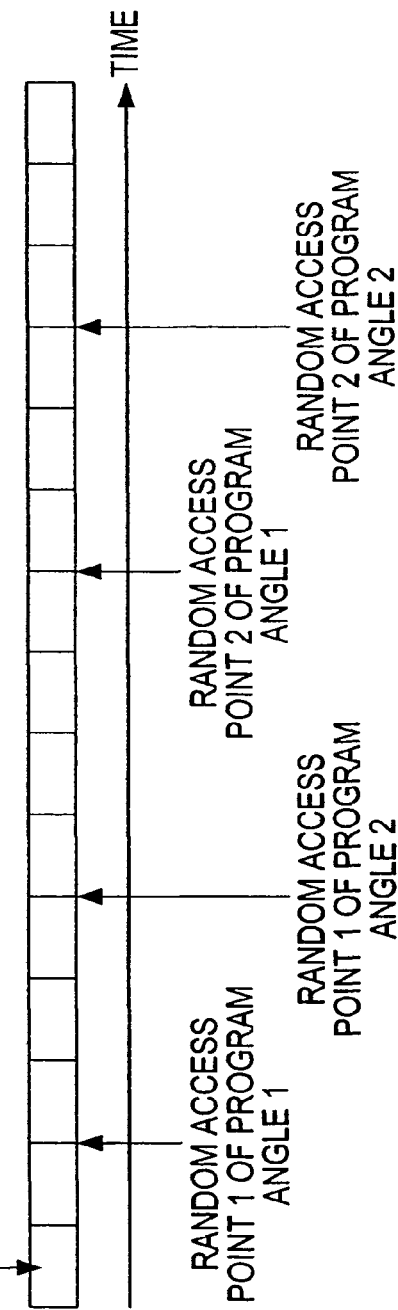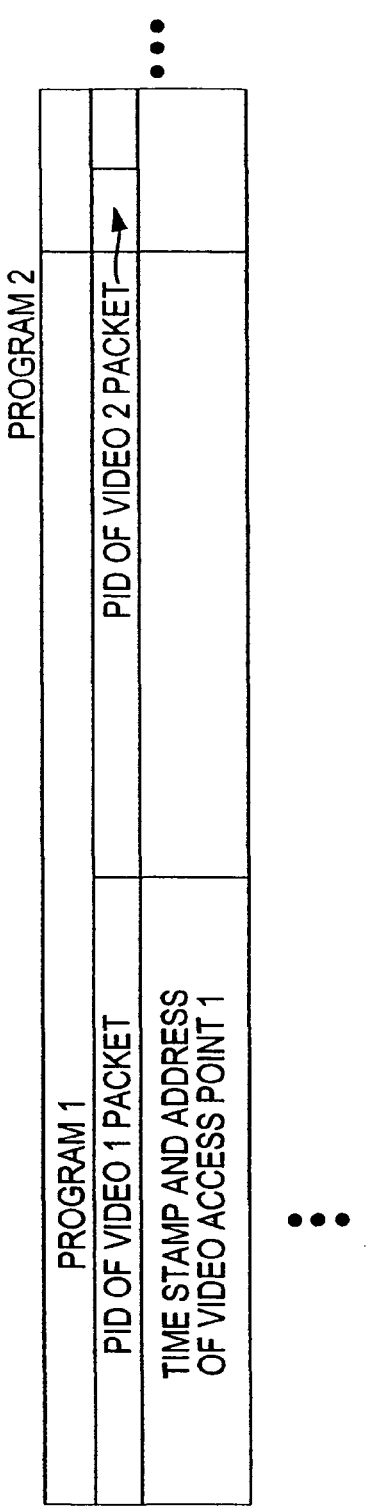

RECORDING APPARATUS, RECORDING METHOD, PLAYBACK APPARATUS, PLAYBACK METHOD AND RECORDING MEDIA, INCLUDING RECORDED LIST OF RANDOM ACCESS POINTS

This is a continuation of application Ser. No. 09/526,192, filed Mar. 15, 2000 now U.S. Pat. No. 6,993,248, the entirety of which is incorporated herein by reference.

The present invention relates generally to a recording apparatus, a recording method, a playback apparatus, a playback method and recording media, and more particularly to a technique for recording or playing back a multiplexed data stream including a plurality of multiplexed AV (Audio Visual) programs.

In a digital television broadcasting system such as the DVB (Digital Video Broadcast) of Europe, the DTV (Digital Television) in the U.S. and the digital BS (Broadcasting Satellite) of Japan, a transport-stream conforming to the MPEG2 (Moving Picture Experts Group 2) specifications is used. A transport stream of such a system includes transport packets arranged continuously. A transport packet is obtained by packetizing predefined portions of typically an MPEG2 video stream or an MPEG1 audio stream. The data length of a transport packet is 188 bytes. A transport stream transmitted as a broadcast wave includes either one or a plurality of multiplexed AV (Audio Video) programs. In general, the multiplexed programs are independent of each other, but need not be.

An AV program transmitted via a transport stream as a television broadcast wave may be recorded by using a receiver and an appropriate recording device at a user's home. The recording operation can be carried out without deteriorating the video and audio qualities of the data transmission. In addition, the user may separate a transport stream into a plurality of AV programs and record only the AV programs of desired channels from a particular transport stream. Thus recording of only the desired separated AV programs from the transport stream is possible. AV programs of a plurality of channels can be recorded at the same time, or, only one AV program can be recorded.

In general, in the case of an MPEG2 video stream, I pictures are encoded at intervals of about 0.5 seconds. An I picture is a picture that is independent and does not rely upon other pictures to decode it. Other pictures are encoded as P or B pictures (these pictures requiring data from at least one other picture to be decoded). Thus, in a video playback operation to begin play back of an MPEG2 video stream from a recording medium by making random accesses to the medium, it is necessary to search the medium for I pictures to start the playback in each case.

Similarly, in an audio playback operation to play back an MPEG1 audio stream from a recording medium by making random accesses to the medium, it is necessary to search the medium for the start byte (the first byte) of an audio frame.

However, it often is difficult to search the medium for I pictures of a video frame and the start byte of an audio frame because it is necessary to analyze the syntax of read out video and audio streams from random byte positions along a transport stream recorded on the recording medium. Thus, it takes time to search the recording medium for I pictures. As a result, it is difficult to carry out a fast random-access playback operation in response to a request made by the user.

In order to fetch from a transport stream a transport packet obtained as a result of packetization of a video signal, it is necessary to know a PID (Packet Identification) included in a packet header. It should be noted that the value of a PID is not standardized. Instead, the author of a transport stream may arbitrarily assign a value to a PID. The value of a PID is described in a packet called a PAT (Program Association Table) and a PMT (Program Map Table), as prescribed by MPEG2 specifications.

Thus, in order to play back a video stream from a transport stream, it is necessary to first search the transport stream for a PAT and PMT packet. For a plurality of random-access playback operations, it is necessary to search the transport stream for a PAT and a PMT packet for each random-access playback request, because it is quite possible that the PID of a video packet may vary along the stream. As a result, it is difficult to carry out a fast random-access playback operation in response to a request made by the user.

In addition, a transport stream may comprise a plurality of multiplexed AV programs and one of the plurality of AV programs may include a plurality of video streams. A plurality of AV programs included in the same transport stream may have different PIDs. A plurality of video streams included in the same AV programs but including different versions of the same program may have PIDs different from each other. In a random-access playback operation to reproduce a program selected by the user, it is necessary to search the transport stream for a PAT and a PMT packet and then it is necessary to search the transport stream for an I picture. It takes time to conduct these search operations. As a result, it is difficult to carry out a fast random-access playback operation in response to a request made by the user.

OBJECTS OF THE INVENTION

It is therefore an object of the invention to provide an improved method and apparatus for recording and playing back information that allows for a fast random-access playback operation in response to a request made by a user.

Another object of the invention is to provide an improved method and apparatus for recording and playing back information that records the location of each I-picture in the recorded data so that a fast random-access playback operation can be performed in response to a request by a user.

A still further object of the invention is to provide an improved method and apparatus for recording and playing back each I-picture to allow for immediate access to the desired I-picture during playback, resulting in a fast random-access playback operation in response to a request made by a user.

Still other objects and advantages of the invention will in part be obvious and will in part be apparent from the specification and the drawings.

SUMMARY OF THE INVENTION

Generally speaking, in accordance with the invention an apparatus and method are provided for recording on a recording medium a data stream including a plurality of video programs multiplexed together. The plurality of video programs are distinguished from each other, and one or more random-access entry points are detected for each video program. A determination is then made as to the position of each detected random-access entry point. This information is then stored in a random-access information table, and is in turn stored on the recording medium.

A reproducing apparatus and method are also provided for reproducing from a recording medium a data stream including a plurality of multiplexed programs and a random-access information table. The table, which is formed for each program, includes positional information indicative of the positions of a plurality of random-access points in the data stream. A controller controls an access point to begin reproducing the video program according to the random-access table information.

A recording medium for storing video data is also provided. The recording medium comprises one region for storing a data stream including a plurality of multiplexed video programs, and another region for storing a random-access table for each program, the table including positional information indicative of the positions of random-access points within the programs.

The invention accordingly comprises the several steps and the relation of one or more of such steps with respect to each of the others, and the apparatus embodying features of construction, combination(s) of elements and arrangement of parts that are adapted to effect such steps, all as exemplified in the following detailed disclosure, and the scope of the invention will be indicated in the claims.

BRIEF DESCRIPTION OF THE DRAWINGS

For a more complete understanding of the invention, reference is made to the following description and accompanying drawings, in which:

FIG. 2 is a diagram showing the syntax of a transport packet;

FIG. 3 is a diagram showing the syntax of an adaption_field;

FIGS. 5(A) and (B) depict another list of random-access points;

DETAILED DESCRIPTION OF THE PREFERRED EMBODIMENTS

Figure 1:
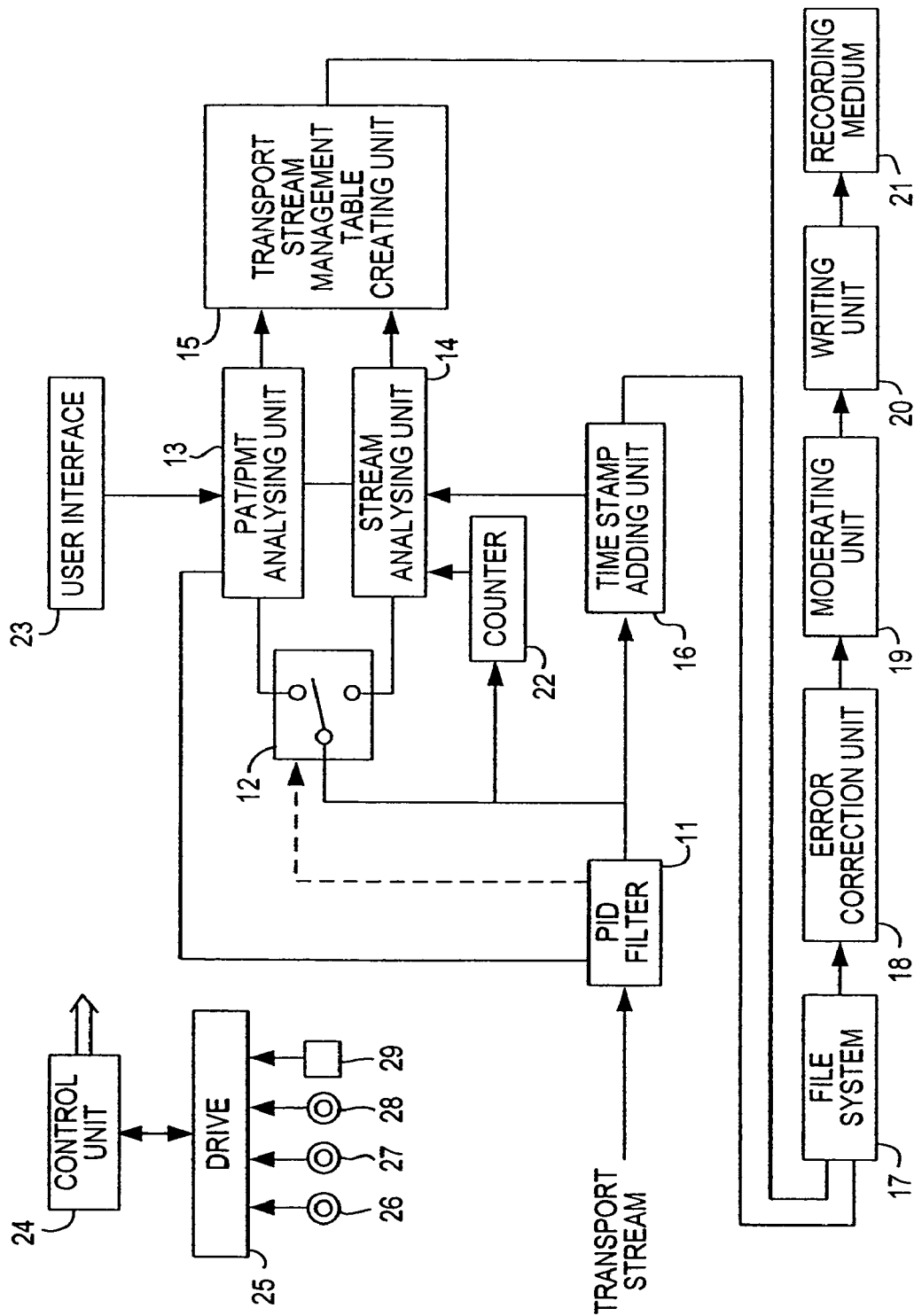
FIG. 1 is a block diagram depicting the configuration of a moving-picture recording apparatus constructed in accordance with the invention.

FIG. 1 is a block diagram depicting the configuration of a moving-picture recording apparatus constructed in accordance with the invention. As is shown in FIG. 1, a PID (Packet Identification) filter 11 receives a transport stream which includes either one or a plurality of multiplexed AV programs. PID filter 11 extracts transport packets from the transport stream, each including a predetermined PID. PID filter 11 then supplies the extracted transport packets to a switch 12, a counter 22 and a time-stamp adding unit 16.

Each of the one or plurality AV program input to PID filter 11 comprises a video stream coded in accordance with MPEG2 video specifications and an audio stream typically coded in accordance with MPEG1 audio specifications. The video and audio streams are multiplexed to form transport packets. FIG. 2 depicts the syntax of a transport packet. As is shown in FIG. 2, a PID has a length of 13 bits placed at a predetermined position in the header of the transport packet. The PID is indicative of the type of data stored in a payload portion of the transport packet.

Referring once again to FIG. 1, if a transport packet supplied to PID filter 11 includes a PAT (Program Association Table), as indicated by a PID of 0x0000, the transport packet including the PAT is passed on to switch 12. Receiving the transport packet including the PAT, switch 12 outputs the packet to a PAT/PMT analyzing unit 13.

A user interface 23 receives information from the user indicating one or more channels from which the user wishes to view AV programs. The information indicating the channels of one or more selected AV programs is supplied to PAT/PMT analyzing unit 13. PAT/PMT analyzing unit 13 supplies a portion of the data, determined in accordance with the transport packet received from PID filter 11 and the information received from user interface 23, to PID filter 11, a stream analyzing unit 14 and a transport-stream-management-table creating unit 15.

PAT/PMT analyzing unit 13 supplies the following pieces of data to transport-stream-management-table creating unit 15 for each AV program.

1. A program_number representative of the AV program
2. A PID of a transport packet of a PMT of the AV program
3. A PID of a transport packet of a video stream, and a stream_type of the video stream of the AV program
4. A PID of a transport packet of an audio stream, and a stream_type of the audio stream of the AV program
5. A PCR_PID of the AV program The program_number is the channel number of the broadcasted AV program to which the PID of the PMT belongs. The stream_type is indicative of the type of data written in the PMT. Examples of the stream_type in the case of a video stream are MPEG2 and MPEG1 whereas examples of the stream_type in the case of an audio stream are MPEG1 and AC-3.

If a plurality of video streams (program versions) are included in one AV program, a PID of a transport packet of the video stream and a stream_type of the video stream of the AV program, described above as #3, are created for each of the video streams versions. The creation of such data holds true of audio streams, described above as #4.

Information indicative of valid random-access points in each of the video and audio streams is supplied by PAT/PMT analyzing unit 13 to transport-stream-management-table creating unit 15. Stream analyzing unit 14 identifies a transport packet that can act as the point where playback can begin as part of a random-access playback operation. Predetermined data is then supplied to transport-stream-management-table creating unit 15 in accordance with the following: the value of "random_access_indicator" included in "adaption_field ( )" of a received transport packet; predetermined data received from PAT/PMT analyzing unit 13; data received from a counter 22; and data received from time-stamp adding unit 16. FIG. 3 depicts the syntax of "adaption_field ( )" of a transport packet. In accordance with MPEG specifications, if the value of "random_access_indicator" of a current transport packet of audio stream is 1, either the current transport packet or a next transport packet having the same PID as the current transport packet are prescribed to include a first byte of audio data that may be decoded without referring to other audio information.

Figures 4A, 4B:
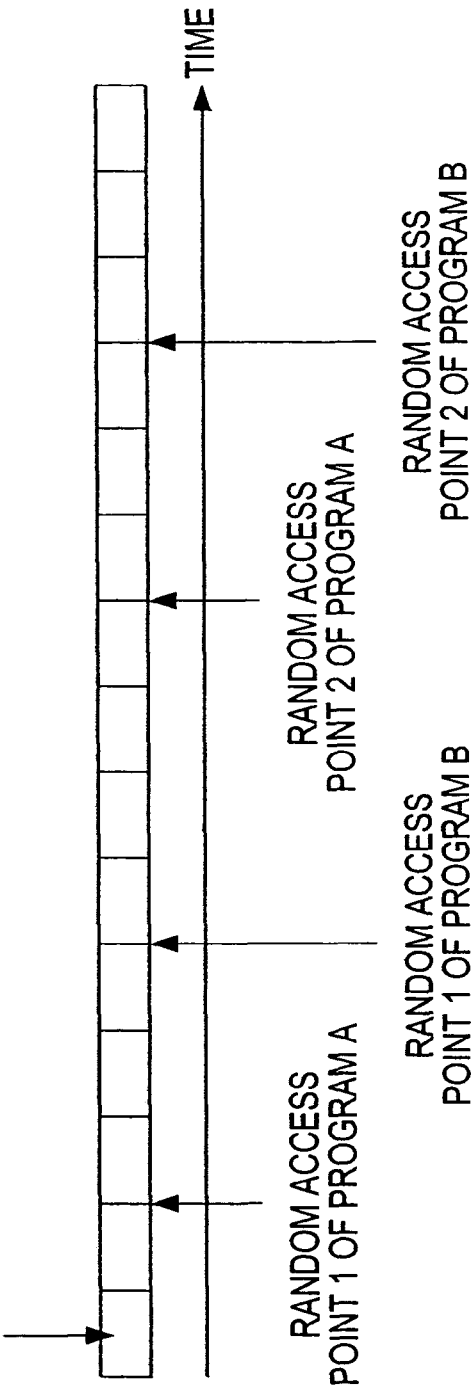
FIGS. 4(A) and (B) depict a list of random-access points.

Transport-stream-management-table creating unit 15 tabulates information indicating a plurality of random-access points of video and audio streams for each transport packet having the same PID. This tabulation is performed on the basis of data received from PAT/PMT analyzing unit 13 and data received from stream analyzing unit 14. FIGS. 4(A) and (B) are explanatory diagrams depicting a list of random-access points included in a transport-stream management table created by transport-stream-management-table creating unit 15. Assume, for example, that 2 programs A and B, are multiplexed in a single transport stream. In this case, random-access points are extracted by stream analyzing unit 14 as shown in FIG. 4(A). Transport-stream-management-table creating unit 15 generates lists of random-access points as shown in FIG. 4(B) on the basis of data extracted by stream analyzing unit 14. A random-access point represents a time stamp of data and a read start address indicating a position where a random-access reproduction can begin. Thus, a random-access request could result in data being reproduced from the random-access point. An address therefore represents the location of data that may be subjected to random-access playback in a recorded transport stream file. An address is indicative of the location of the first byte of a 4-byte header added to a transport packet including data that may be subjected to a random-access playback. An address may also represent the position of the first byte of a transport packet or the position of the first byte of data subjected to a random-access playback, in accordance with alternative embodiments of the invention.

FIG. 5 depicts another example of a list of random-access points included in a transport-stream management table created by transport-stream-management-table creating unit 15. This concept may be adopted, for example, in a multiangle program. Here, a program of a transport stream includes 2 multiplexed video streams depicting similar content but from two different locations. In this case, stream analyzing unit 14 extracts random-access points as shown in FIG. 5(A). Transport-stream-management-table creating unit 15 generates lists of random-access points shown in FIG. 5(B), similar to those depicted in FIG. 4(B) on the basis of random-access points extracted by stream analyzing unit 14.

A list of random-access points is generated and managed for each program multiplexed in the transport stream. Transport-stream-management-table creating unit 15 then outputs a generated transport-stream management table including lists of random-access points to a file system 17.

Figure 6:
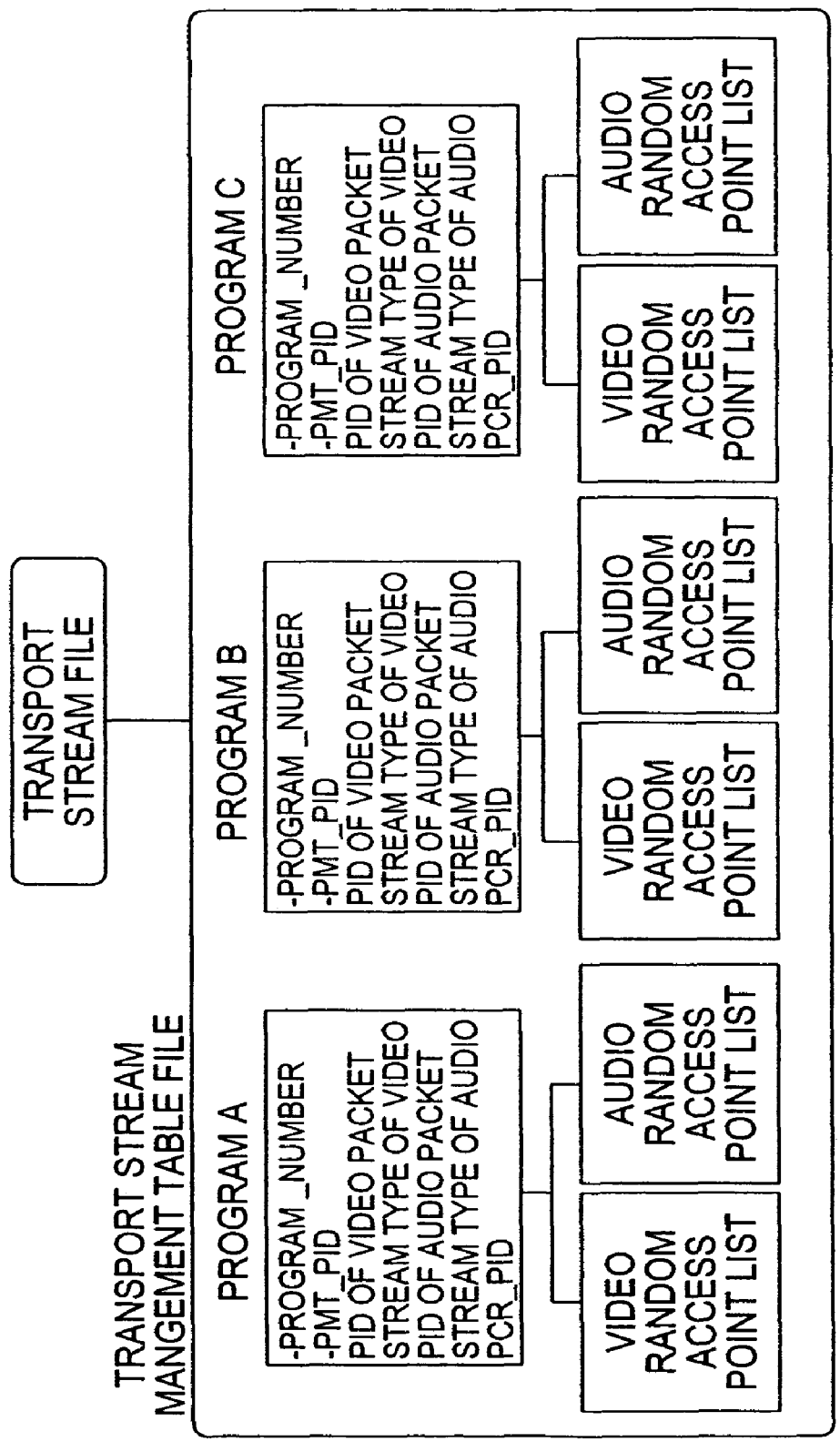
FIG. 6 is a diagram depicting the relation between a transport stream and a transport-stream management table.

FIG. 6 depicts the relation between a transport stream and a corresponding transport-stream management table. The relation is exemplified by the case in which a transport-stream includes 3 multiplexed AV programs. A list of random-access points is generated and managed for each AV program, The list of random-access points contains the following pieces of data.

1. A program_number of the AV program
2. A PID of a transport packet of a PMT of the AV program
3. A PID of a transport packet of a video stream, and a stream_type of the video stream of the AV program
4. A PID of a transport packet of an audio stream, and a stream_type of the audio stream of the AV program
5. A PCR_PID of the AV program
6. A list of video random-access points
7. A list of audio random-access points Data representing the program_number of an AV program, the PID of a transport packet of a PMT of the AV program, the PID of a transport packet of a video stream and a stream_type of the video stream of the AV program, the PID of a transport packet of an audio stream and a stream_type of the audio stream of the AV program are included in a packet of a PAT or a PMT in the transport stream. However, because packets of PATs or PMTs are inserted at intervals of 100 ms, using only this data takes time to fetch a PAT or PMT packet when a random-access request is made, because the precise location of these packets is not known.

In order to solve the problem described above, in accordance with the invention, information stored in a PAT or PMT packet is also stored in the transport-stream management table, making it no longer necessary to read out the information from the transport stream itself. Rather, this required information can easily be reproduced from the transport-stream management table. As a result, predetermined data can be read out at a high speed, because only access to the transport-stream management table is necessary.

Figure 7:
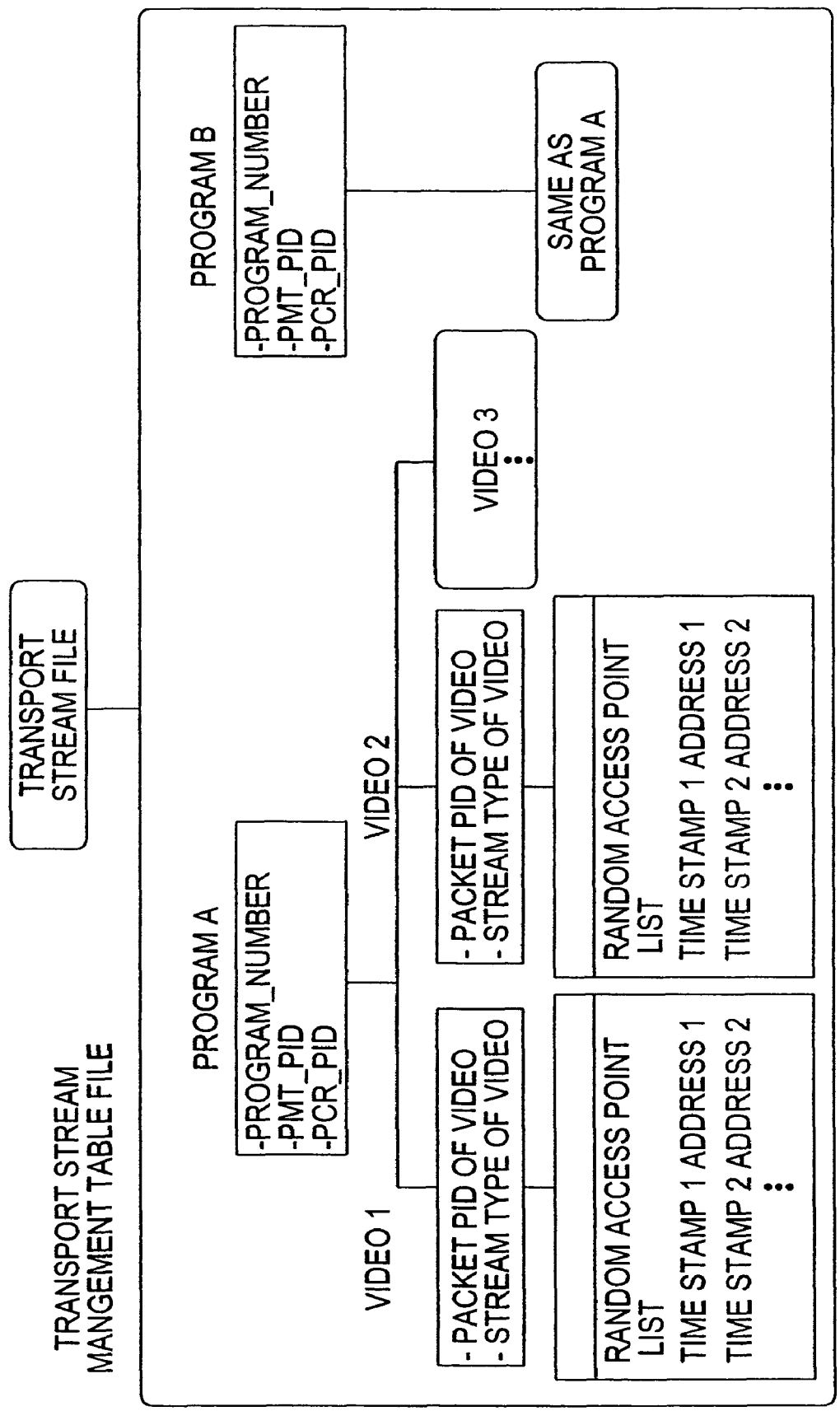
FIG. 7 is a diagram depicting another relation between a transport stream and a transport-stream management table.

FIG. 7 depicts the relation between a transport stream and a transport-stream management table. One program (A) of the transport-stream includes a plurality (more than two) of multiplexed video streams. Similar information as the information shown in FIG. 6 is stored in the transport-management stream table of FIG. 7. If the transport stream includes a plurality of video streams, a list of random-access points is created for each of the video streams. Lists of random-access points are distinguished from each other by packet PIDs. It should be noted that, much like video streams, a list of random-access points is created for each audio stream and lists of random-access points for the audio streams are similarly distinguished from each other by packet PIDs.

Referring once again to FIG. 1, counter 22 counts the number of bytes included in a series of packets received from PID filter 11, from the first packet to the current packet of a transport stream to be recorded. The count is then supplied to stream analyzing unit 14.

Time-stamp adding unit 16 receives a transport packet from PID filter 11 and outputs to stream analyzing unit 14 a time stamp showing the arrival time of the transport packet. The time-stamp adding unit supplies to file system 17 the transport packet including the additional time stamp representing the arrival time. The time stamp is typically similar to a packet header with a length of 4 bytes added to the transport packet prescribed in a D-VHS format. With the time stamp of a first recorded transport packet set at 0, the time stamp of a succeeding transport packet indicates the lapse of recording time from the first transport packet to the succeeding transport packet.

File system 17 converts each transport packet received from time-stamp adding unit 16 into a file that includes the data from the transport stream, and also converts the transport-stream management table received from the transport-stream-management-table creating unit 15 into a predetermined file. The file output by file system 17 is subjected to predetermined processing in an error correction unit 18 and a modulation unit 19 before being supplied to a write unit 20 which records the file onto a recording medium 21.

A control unit 24 controls a drive 25 to read out a control program from a magnetic disc 26, an optical disc 27, an optical magnetic disc 28 or a semiconductor memory 29. The control program read out by drive 25, and information such as a command entered by a user to user interface unit 23, serve as a basis for controlling components of the moving-picture recording apparatus of the invention.

Figure 8:
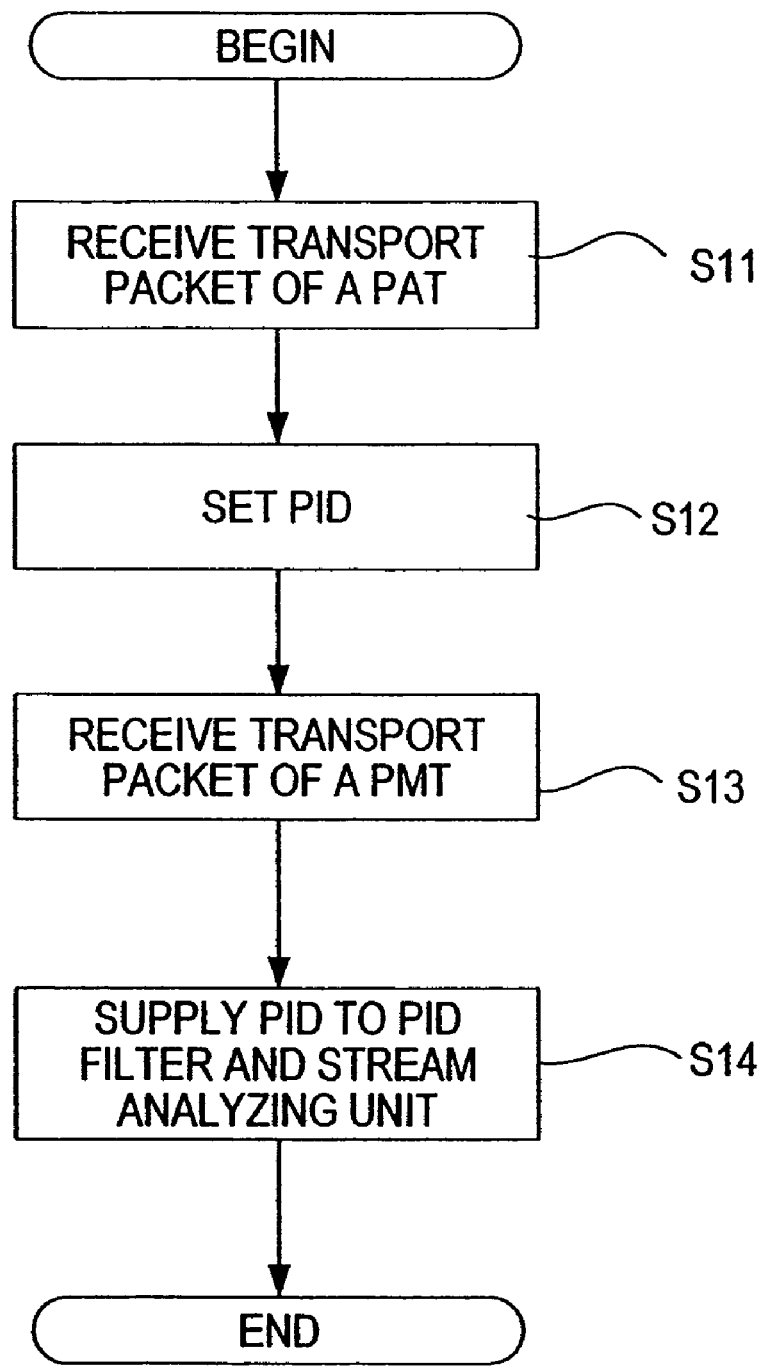
FIG. 8 depicts a flowchart representing processing carried out by a PAT/PMT analyzing unit to analyze a PAT or a PMT packet.

As described above, a transport stream and a transport-stream management table are recorded onto recording medium 21, each as a predetermined file. A random-accessible medium such as an optical disk, optical-magnetic disk, magnetic disk or solid state memory is preferably employed as recording medium 21. Tape or other recording media may also be employed Referring next to FIG. 8, a flowchart representing processing carried out by PAT/PMT analyzing unit 13 to analyze a PAT or a PMT packet is shown. At step S11 PAT/PMT analyzing unit 13 receives a transport packet of a PAT. The PAT includes a PID of a transport packet of the PMT of each program multiplexed in the transport stream. PAT/PMT analyzing unit 13 acquires a PID of a transport packet of the PMT of an AV program selected by a user via user interface 23.

At step S12, PAT/PMT analyzing unit 13 sets a PID of a transport packet of the PMT of each program in PID filter 11. PID filter 11 extracts transport packets with these PIDs of the PMTs and supplies the transport packets to PAT/PMT analyzing unit 13.

At step S13, PAT/PMT analyzing unit 13 receives a transport packet of the PMT from PID filter 11 via switch 12. The PMT includes the PID of the transport packet, including in a payload portion thereof video and audio streams of a requested AV program. PAT/PMT analyzing unit 13 therefore extracts the PID of the transport packet having in the payload portion thereof a video or audio stream comprising the AV program selected by user interface 23.

At step S14, PAT/PMT analyzing unit 13 supplies the PID of the extracted transport packet having a video or audio stream composing a program selected by using the user interface 23 in a payload thereof to PID filter 11 and stream analyzing unit 14. PID filter 11 extracts from an input transport stream transport packets of video and audio streams specified by PAT/PMT analyzing unit 13 and supplies the extracted transport packets to stream analyzing unit 14 by way of switch 12. Transport packets other than the transport packets of video and audio streams (such as packets of service information) are not supplied to stream analyzing unit 14.

Figure 9:
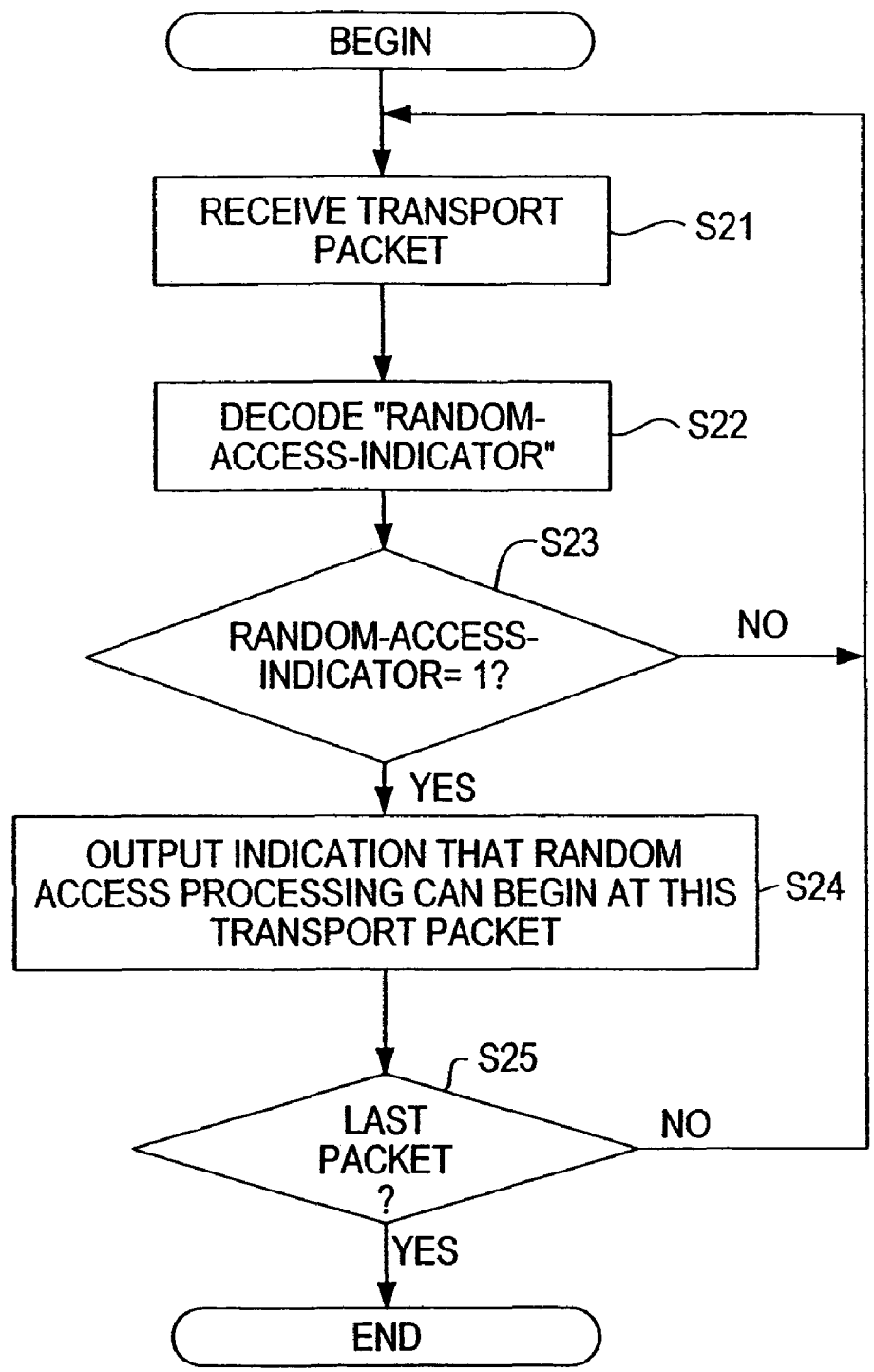
FIG. 9 depicts a flowchart representing processing carried out by a data stream analyzing unit to analyze a data stream.

Referring next to FIG. 9 a flowchart representing processing carried out by stream analyzing unit 14 to analyze a transport stream is shown. As is shown in FIG. 9, at step S21 stream analyzing unit 14 receives a transport packet of a video or audio stream from PID filter 11 via the switch 12. At step S22, stream analyzing unit 14 decodes a "random_access_indicator" included in the header of the received transport packet.

At step S23, stream analyzing unit 14 inquires whether or not the value of "random_access_indicator" is equal to 1. If the inquiry indicates that the value of "random_access_indicator" is equal to 1, the transport packet is determined to be a point at which a random-access playback operation can begin. In this case, processing proceeds to step S24 to output information to transport-stream-management-table creating unit 15, indicating that the transport packet is a point at which a random-access playback operation can begin. Thus, stream analyzing unit 14 to the transport-stream-management-table creating unit 15 supplies the PID and the time stamp of the transport packet as well as the number of bytes from the beginning of the transport packet.

At step S25, stream analyzing unit 14 then inquires whether or not the present transport packet is the last packet If the inquiry indicates that the present transport packet is the last packet, processing ends. If the inquiry at step S25 indicates that the present transport packet is not the last packet, processing proceeds back to step S21 and the illustrated processing is repeated on the next packet.

If the inquiry at step S23 indicates that the value of "random_access_indicator" is not equal to 1, the transport packet is determined to be not a point at which a random-access playback operation can begin. In this case, processing returns to step S21, and the processing is repeated on the next packet.

As described above, stream analyzing unit 14 receives transport packets of a video or audio stream and supplies information to transport-stream-management-table creating unit 15 indicating whether each transport packet is a point at which a random-access playback operation can begin.

The following description explains processing which is carried out by the moving-picture recording apparatus of the invention when a "random_access_indicator" is not used. Such a transport stream has all values of "random_access indicator" set to 0.

Figure 10:
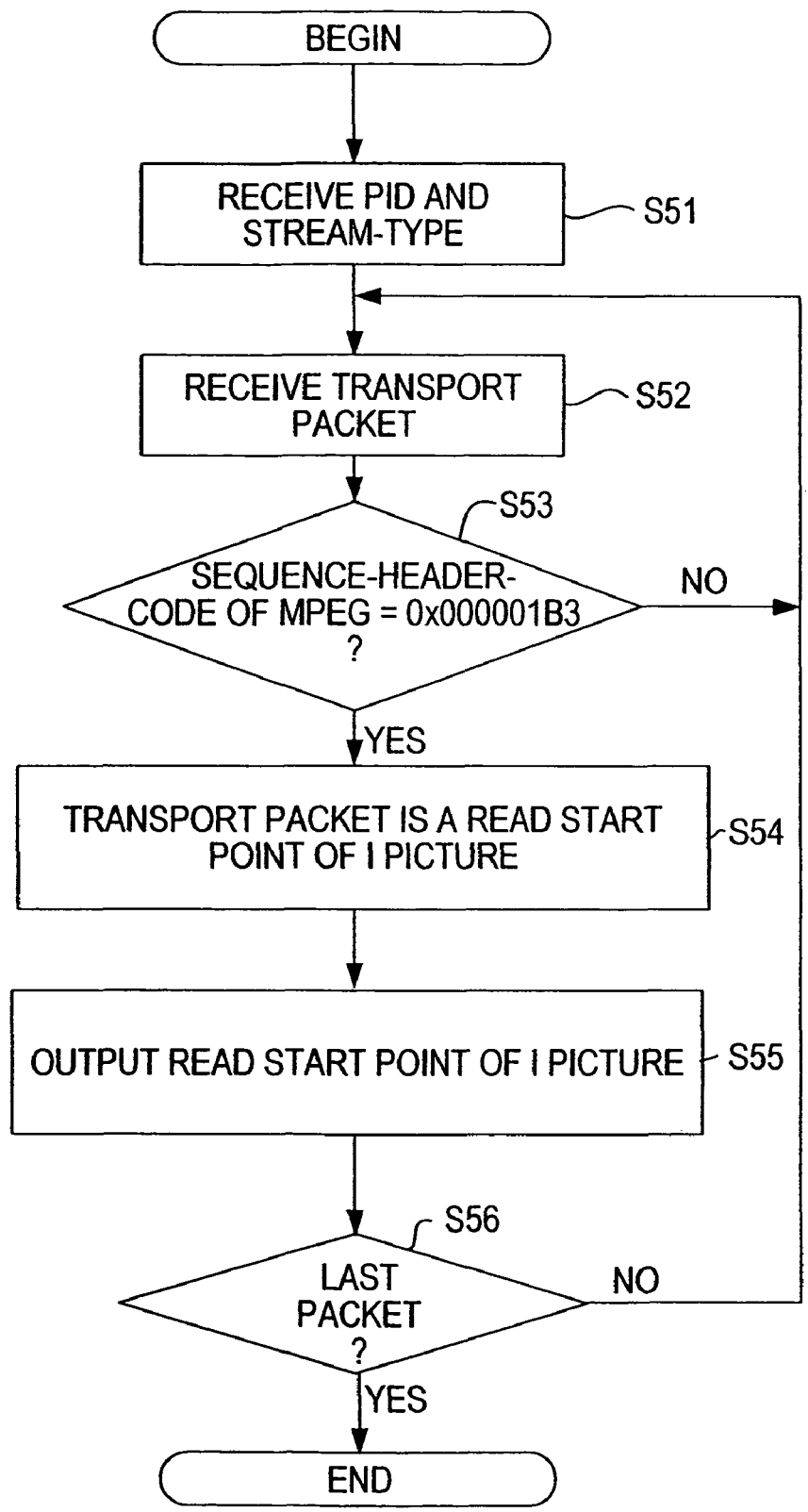
FIG. 10 depicts a flowchart representing processing carried out by a data stream analyzing unit to analyze video data.

As is shown in FIG. 10, a flowchart depicts processing carried out by stream analyzing unit 14 to analyze this transport stream. At step S51 stream analyzing unit 14 receives the PID and the stream_type of a video stream to be recorded from PAT/PMT analyzing unit 13. If a plurality of AV programs are included in the transport stream to be recorded, the PID and the stream_type of the video stream for each AV program are input to PAT/PMT analyzing unit 13.

At step S52, stream analyzing unit 14 receives a transport packet from the video stream. If plural AV programs are included in the transport stream to be recorded, a plurality of video buffers, corresponding to the number of AV programs, are provided. Upon receiving a transport packet of a video stream, stream analyzing unit 14 supplies the payload of the received transport packet to the appropriate video buffer so that the information in the payload can be prepared for playback.

At step S53, stream analyzing unit 14 inquires whether or not a sequence_header_code of the MPEG video stream which is a 32-bit code of 0x000001B3 is included in a stream stored in a particular video buffer. If the inquiry indicates that a sequence_header_code of the MPEG video stream is included in the stream stored in the particular video buffer, processing proceeds to step S54, at which a transport packet including the first byte of the sequence_header_code is determined to be a read start point of an I picture, and may therefore be subjected to a random-access processing operation.

At step S55, stream analyzing unit 14 outputs the read start point of the I picture determined by step S54 to transport-stream-management-table creating unit 15. In addition, the PID of the video stream, the time stamp of the read start point of the packet and the number of bytes from the beginning of the transport stream file to the current transport packet are also supplied to transport-stream-management-table creating unit 15. An absolute address of the head start point of the packet on the recording medium 21 may be supplied to the transport-stream-management-table creating unit 15 as well.

At step S56, stream analyzing unit 14 inquires whether or not the present transport packet is the last packet. If the inquiry indicates that the present transport packet is the last packet, processing ends. If the inquiry at step S56 indicates that the present transport packet is not the last packet, processing returns to step S52 and the aforedescribed processing is repeated.

If the inquiry at step S53 indicates that the stream stored in the video buffer does not include a sequence_header_code equal to the predetermined value, processing returns to step S52 and the transport stream processing is repeated.

Figure 11:
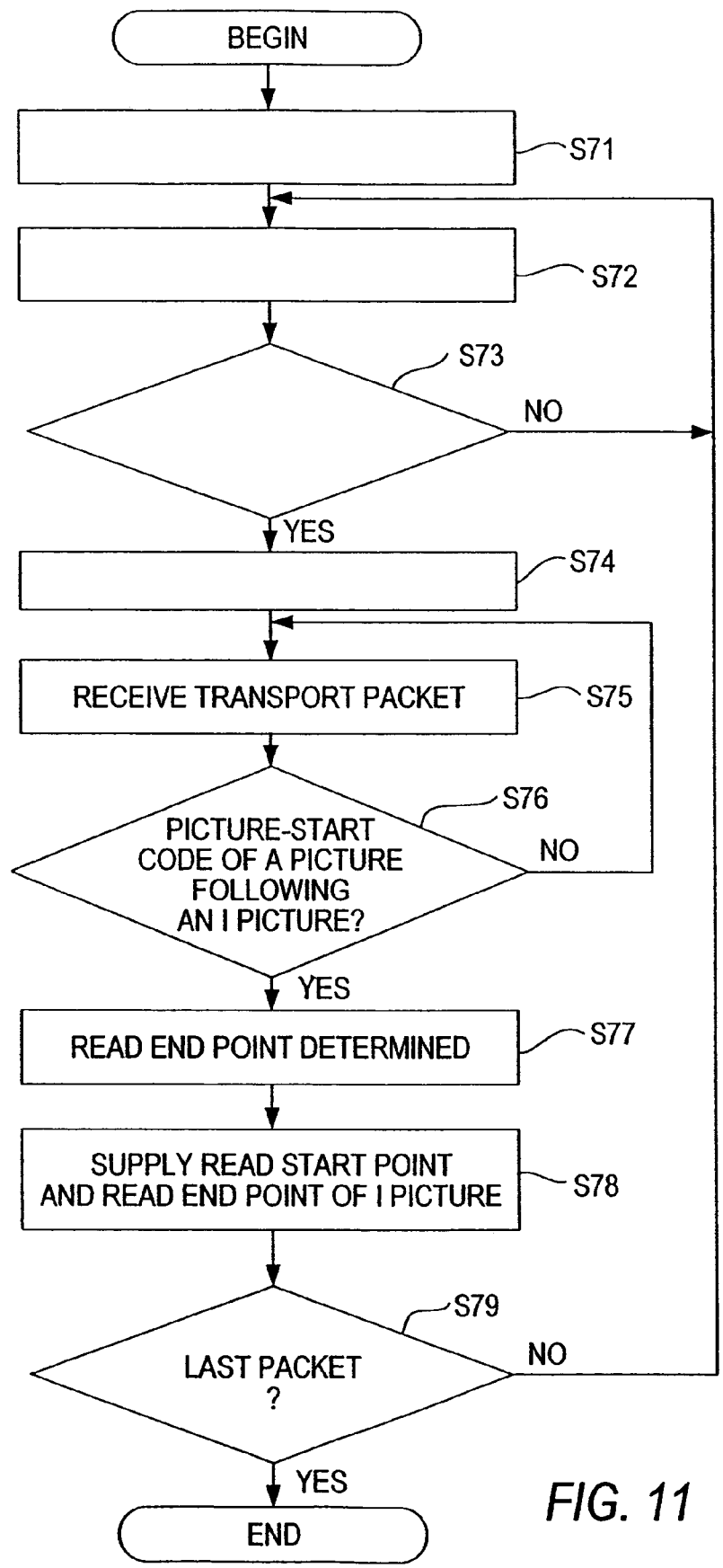
FIG. 11 depicts a flowchart representing other processing carried out by a data stream analyzing unit to analyze video data.

Referring next to FIG. 11, there is shown a flowchart representing additional processing carried out by stream analyzing unit 14 to analyze a transport stream of video data with all values of "random_access_indicator" set at 0. Processing carried out at steps S71 to S74 is similar to that carried out at steps S51 to S54 of FIG. 10.

At step S75, stream analyzing unit 14 receives a transport packet of a video stream having the same PID as the preceding video packet, and therefore appends the data from the payload portion of the received transport packet to the last data currently in the video buffer.

At step S76, stream analyzing unit 14 inquires whether or not a stream stored in the video-stream buffer includes a picture_start_code of a picture following an I picture whose read start point was determined at step S74. The picture_start_code is a 32-bit code of 0x00000100. If inquiry S76 is answered in the affirmative, processing continues to step S77, where a transport packet including the last byte of the picture_start_code is determined to be the read end point of the I-picture data.

If the inquiry at step S76 indicates that the stream stored in the video-stream buffer does not include a picture whose picture_start_code follows the I picture, processing returns to step S75.

At step S78, stream analyzing unit 14 supplies the read start point of the I picture (determined at step S74) and the read end point of the I picture (determined at step S77) to transport-stream-management-table creating unit 15. In addition, the PID of the video stream, the time stamp of the read start point of the transport packet, the number of bytes from the beginning of the transport stream file to the read start point of the I-picture data, and the number of bytes from the beginning of the transport stream file to the read end point of the I-picture data are also supplied to the transport-stream-management-table creating unit.

At step S79, stream analyzing unit 14 inquires whether or not the present transport packet is the last packet. If not, processing returns to step S72 and the aforedescribed operation is repeated. If the inquiry at step S79 indicates that the present transport packet is the last packet, processing ends.

As described above, in accordance with the procedure depicted in the flowchart of FIG. 11, stream analyzing unit 14 is capable of supplying the data representing the read start and end points of an I picture to transport-stream-management-table creating unit 15. In this embodiment, the byte length between the read start and end points may also be transmitted to unit 15 to be written into the transport-stream-management-table.

Figure 12:
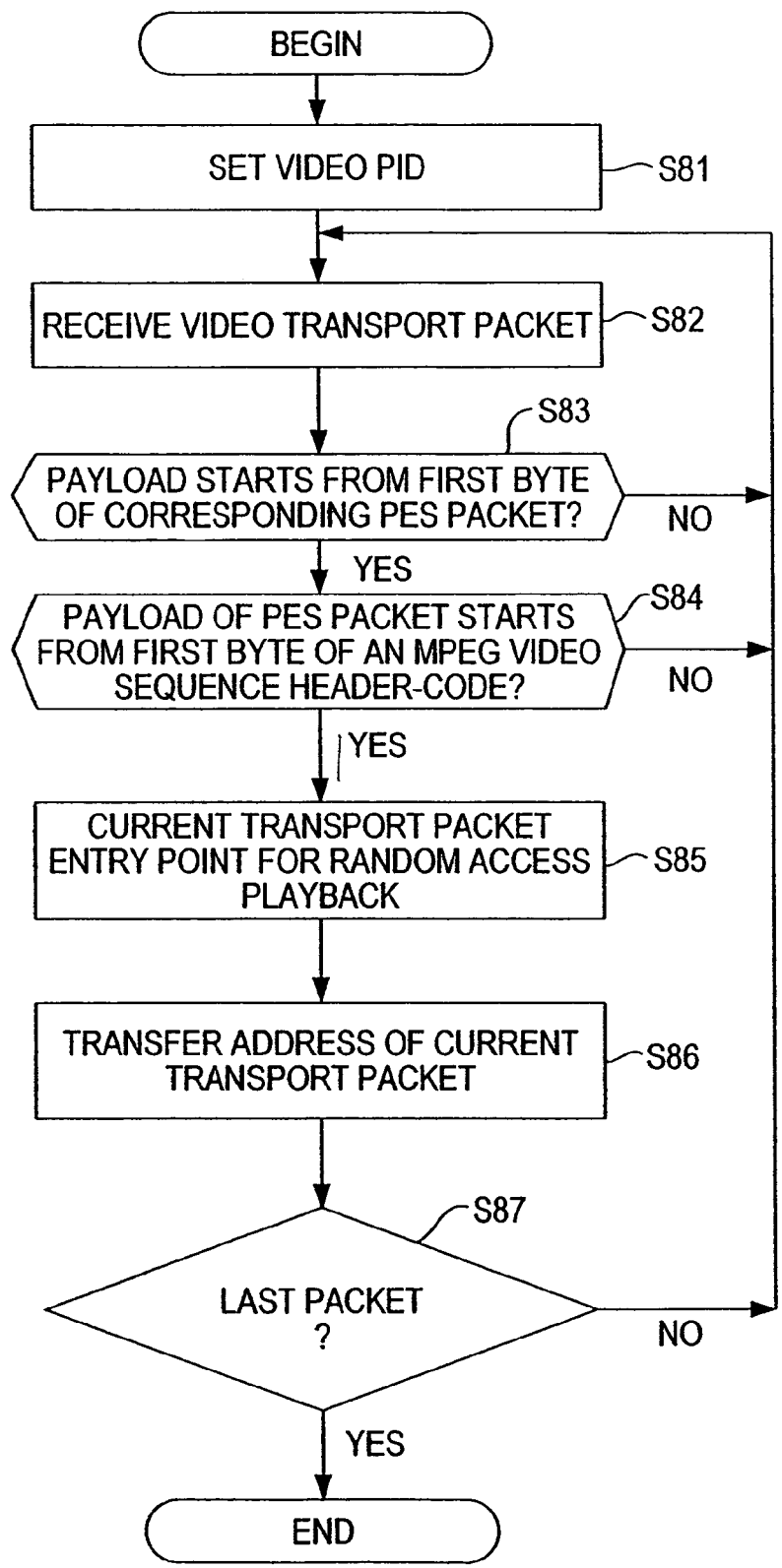
FIG. 12 depicts a flowchart representing still other processing carried out by a data stream analyzing unit to analyze a transport stream of video data.

Referring next to FIG. 12, a flowchart depicting additional processing to be carried out by stream analyzing unit 14 is shown. This processing is performed in accordance with the assumption that 1 video picture is packetized into I PES packet. Such packetizing conforms to an encoding method prescribed by digital broadcasting systems such as DTV in the US and ISDB in Japan.

As is shown in FIG. 12, at step S81 stream analyzing unit 14 designates the video PID of an AV program to be recorded. If a plurality of programs are included in a transport stream, the video PID of each of the programs is designated.

At step S82, stream analyzing unit 14 receives a video transport packet. At step S83, the stream analyzing unit inquires whether or not data in a payload portion of the transport packet starts from the first byte of the corresponding PES packet. This is attained by determining whether or not the value of payload_unit_start_indicator in the header of the transport packet is 1. If this inquiry is answered in the affirmative, that is, if the data in payload of the transport packet starts from the first byte of the PES packet, processing continues to step S84.

At step S84, stream analyzing unit 14 inquires whether or not a payload of the PES packet starts from the first byte of an MPEG video sequence_header_code which is a code having a length of 32 bits and a value of "0x000001B3". If this inquiry is answered in the affirmative, processing proceeds to step S85 where the current transport packet is used as an entry point for a requested random-access playback operation.

Then, at step S86, stream analyzing unit 14 transfers the address of the current transport packet, which has been determined to be the read start point, to transport-stream-management-table creating unit 15. This address is followed by a video PID, a time stamp of the read start point and an indication of the number of bytes from the head of the transport stream file to the current packet, which are also transferred to the transport-stream-management-table creating unit.

At step S87, stream analyzing unit 14 inquires whether or not the current transport packet is the last transport packet. If not, processing returns to step S82 to repeat the foregoing operation. If the current transport packet is the last transport packet, processing ends.

If the inquiry at step S83 indicates that the value of payload_unit_start_indicator in the header of the transport packet is not 1, that is, if the payload of the transport packet does not start from the first byte of the PES packet, processing returns to step S82 to repeat the aforedescribed operation. Similarly, if the inquiry at step S84 indicates that the payload of the PES packet does not start from the first byte of the video sequence_header_code, processing returns to step S82 to repeat the illustrated operation.

Figure 13:
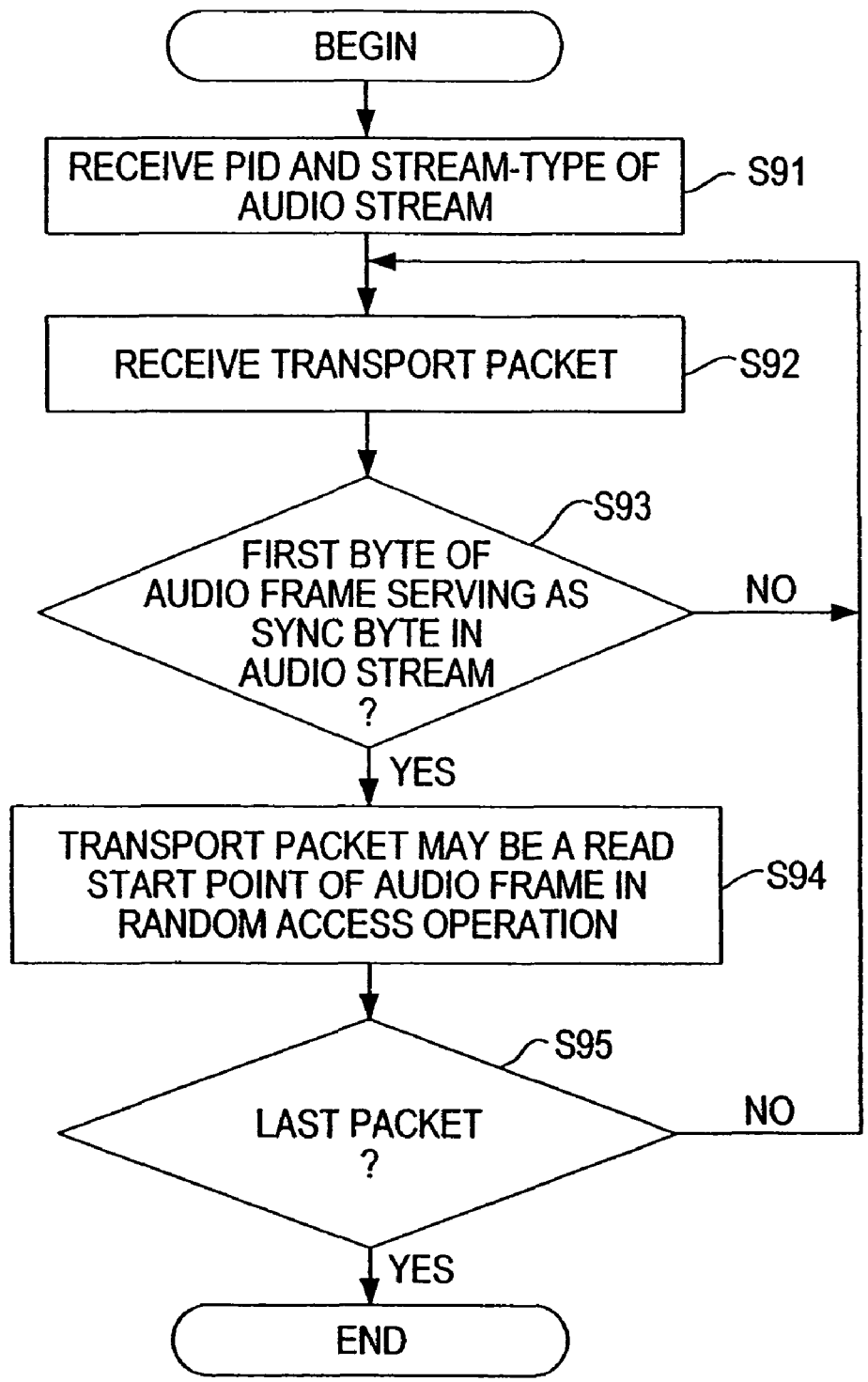
FIG. 13 depicts a flowchart representing further processing carried out by a data stream analyzing unit to analyze a transport stream of audio data.

Referring next to FIG. 13 a flowchart depicting processing carried out by stream analyzing unit 14 to analyze a transport stream of audio data is shown. At step S91 stream analyzing unit 14 receives from PAT/PMT analyzing unit 13 the PID and the stream_type of an audio stream to be recorded. At step S92, stream analyzing unit 14 receives a transport packet of the audio stream.

At step S93, stream analyzing unit 14 inquires whether or not the audio stream includes, as the first byte of the audio frame, a sync_byte. If so, processing proceeds to step S94 at which stream analyzing unit 14 supplies information to transport-stream-management-table creating unit 15 indicating that the packet which includes the sync_byte of the audio frame may be a read start point in a random-access operation. In addition, the PID of the audio packet, the time stamp of the audio packet and the number of bytes from the beginning of the transport stream to the current transport packet are supplied to the transport-stream-management-table creating unit.

At step S95, stream analyzing unit 14 inquires whether or not the present transport packet is the last packet. If it is, processing ends. But, if not, processing returns to step S92, and the aforedescribed operation is repeated. Similarly, if the inquiry at step S93 indicates that the first byte of an audio frame is not the sync byte, processing returns to step S92.

In the event a plurality of AV programs are included in a transport stream to be recorded, the audio packets of each of the AV programs for each audio stream is analyzed in the aforedescribed manner.

A time stamp of each random-access point can also be computed on the basis of a PTS (Presentation Time Stamp) of an audio frame or an I picture. A PTS comprises information added to the header of a PES packet in accordance with MPEG2 specifications. In this case, if the PTS of a first displayed video stream of the transport stream to be recorded is used as an offset, the time stamp which is managed by a list of random-access points represents the absolute display time of the random-access point. If a PTS is used as a time stamp, further processing is used to detect a PTS at step S22 of the flowchart of FIG. 9, step S52 of the flowchart of FIG. 10, step S72 of the flowchart of FIG. 11, step S82 of the flowchart FIG. 12 and step S92 of the flowchart FIG. 13.

In addition, the processing carried out at step S53 of the flowchart of FIG. 10, step S73 of the flowchart of FIG. 11 and step S84 of the flowchart of FIG. 12 are not limited to the illustrated inquiries. For example, if stream analyzing unit 14 inquires whether or not an I picture follows a sequence_header_code of the video stream, an access point is determined with a higher degree of reliability. In this case, a sequence_header_code is first detected and then inquiry is made to determine whether or not the value of the picture_coding_type of an immediately succeeding picture is "001", indicating an I picture.

Figure 14:
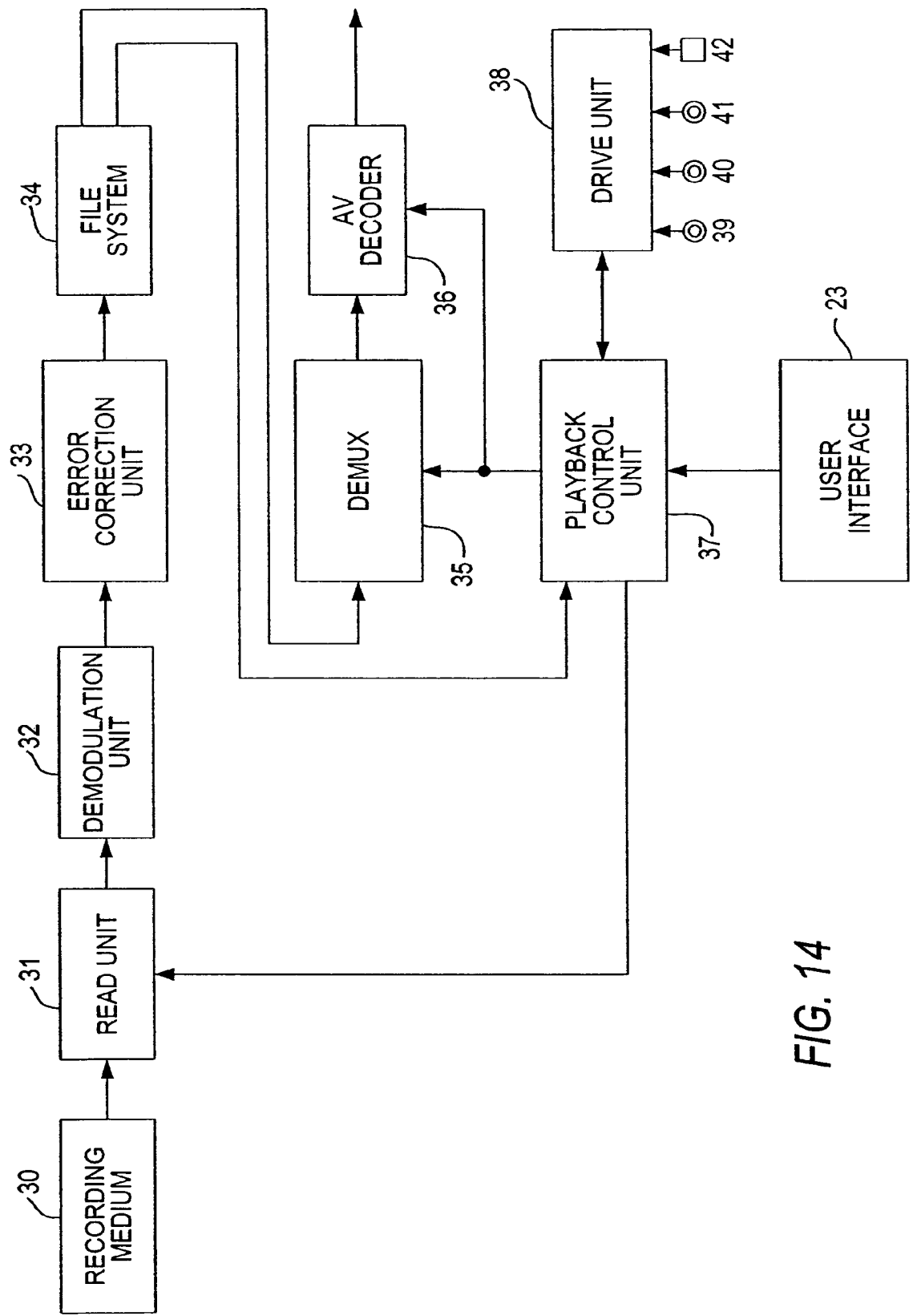
FIG. 14 is a block diagram depicting the configuration of a moving-picture playback apparatus constructed in accordance with the invention.

FIG. 14 is a block diagram showing the configuration of a moving-picture playback apparatus provided in accordance with the invention. A recording medium 30 contains the transport-stream file and the stream management table file which were previously recorded in accordance with the moving-picture recording apparatus of the invention. The transport stream contains one or a plurality of multiplexed AV programs.

A read unit 31 reads out the transport-stream file and the stream management table file from the recording medium 30, and supplies the transport-stream and stream management table files to a demodulation unit 32. Demodulation unit 32 demodulates the transport-stream and stream management table files and outputs the demodulated files to an error correction unit 33. The error correction unit corrects data errors in the demodulated files and supplies the error-corrected files to a file system 34 which supplies the transport stream to a demultiplexer 35 and the stream management table to a playback control unit 37.

Playback control unit 37 controls the operation of a drive unit 38 to read the control program stored in a magnetic disc 39, an optical disc 40, an optical magnetic disc 41 or a semiconductor memory 42. The playback control unit controls the operation of read unit 31 in accordance with the read out control program and data received from a user interface 23. Playback control unit 37 also controls demultiplexer 35 and an AV decoder 36 in accordance with data received from the user interface and the stream management table. The playback control unit outputs to demultiplexer 35 and AV decoder 36 the PID of a transport packet of the PMT of the AV program to be read out, the PID of a transport packet of a video stream composing the AV program, the stream_type of the video stream, the PID of a transport packet of an audio stream composing the AV program, the stream_ype of the audio stream and a PCR_PID.

Demultiplexer 35 separates the transport packets of the video and audio streams from the transport stream received from file system 34 and supplies the transport packets to AV decoder 36. The AV decoder receives the demultiplexed transport packets of the video and audio streams and decodes the packets to generate video and audio signals under the control of playback control unit 37.

Figure 15:
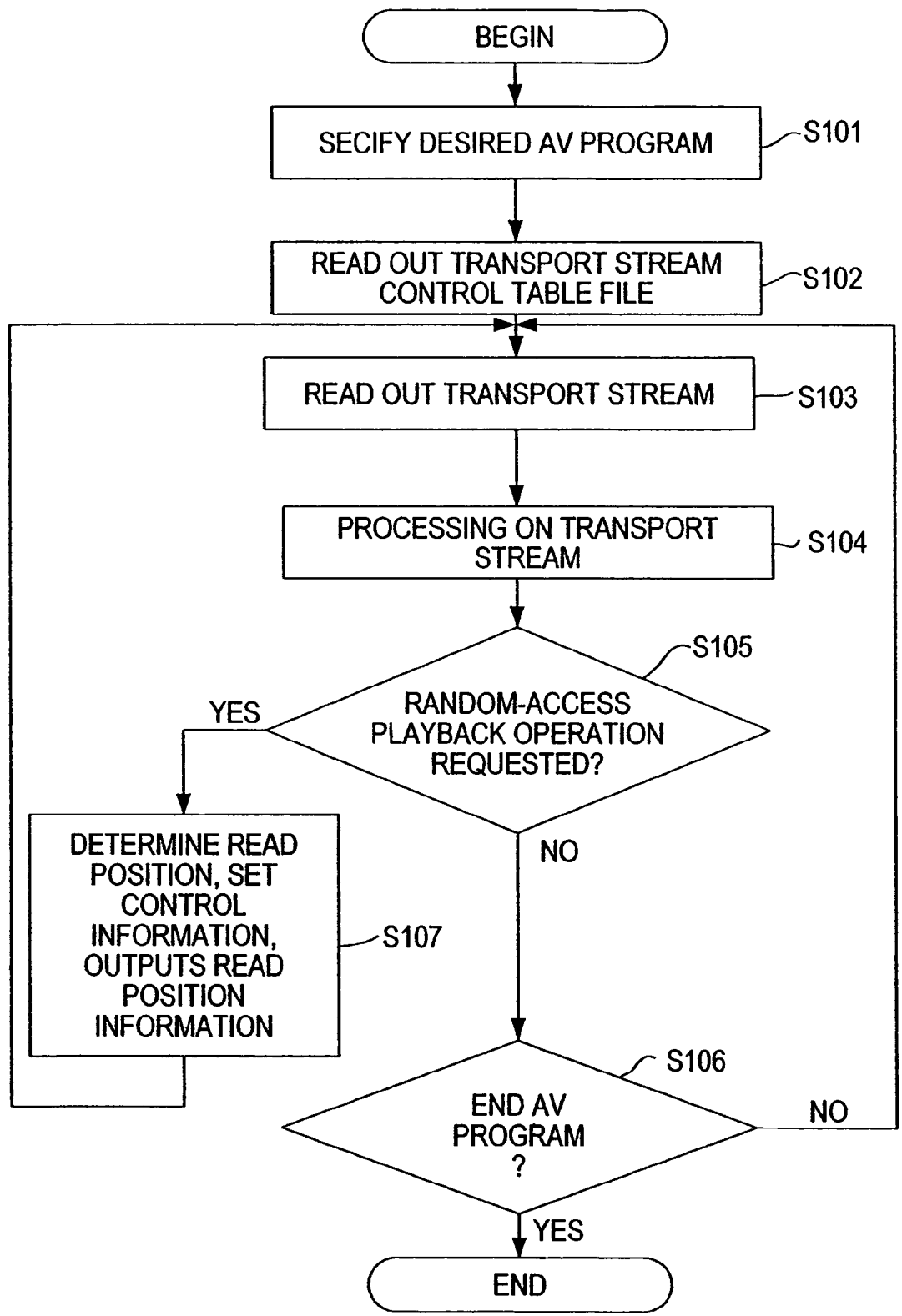
FIG. 15 depicts a flowchart representing processing carried out by the moving-picture playback apparatus of FIG. 14.

Referring next to FIG. 15, a flowchart depicting processing carried out by the moving-picture playback apparatus of FIG. 14 is shown. As is shown in FIG. 15, at step S101 a user specifies a desired AV program to be played back by operating user interface 23. User interface 23 supplies information indicating the specified AV program to playback control unit 37.

At step S102, playback control unit 37 drives read unit 31 to read out from recording medium 30 a transport-stream control table file for the specified AV program. The read out transport-stream control table file is then subjected to processing carried out by demodulation unit 32, error correction unit 33 and file system 34 before being supplied to playback control unit 37. At step S103, playback control unit 37 drives read unit 31 to read out from recording medium 30 a transport stream for the specified AV program.

At step S104, demodulation unit 32 demodulates the transport stream file received from the read unit 31 and outputs the demodulated transport stream file to error correction unit 33 which corrects data errors contained in the demodulated transport stream file and outputs the file to file system 34 which forwards the transport stream to demultiplexer 35. Controlled by playback control unit 37, demultiplexer 35 separates from the transport stream transport packets of the video and audio streams of the AV program specified by the user and supplies the transport packets to AV decoder 36. Also controlled by playback control unit 37, AV decoder 36 decodes the demultiplexed transport packets to generate video and audio signals.

At step S105, playback control unit 37 inquires whether or not a random-access playback operation has been requested by a user via user interface 23. If the inquiry indicates that a random-access playback operation has not been requested, processing proceeds to step S106 to determine whether or not the end of the AV program being played back has been reached. If not, processing returns to step S103 and playback processing continues by further reading out the transport stream from recording medium 30. If the inquiry at step S106 indicates that the end of the AV program being played back has been reached, processing ends.

If the inquiry at step S105 indicates that a random-access playback operation has been requested, processing proceeds to step S107 at which playback control unit 37 determines the read position on the transport stream on the basis of the transport-stream management table, sets the control information of the AV program to be read out next and outputs information indicating the read position to read unit 31. Processing then returns to step S103 and read unit 31 reads out the specified transport stream, as playback processing is repeated.

During use, if an AV program specified by the user is requested to be played back from a middle point thereof, playback control unit 37 searches the list of time stamps included in the transport-stream management table for a time stamp closest to the specified desired point of time. The playback control unit then controls read unit 31 to read out the data of an I picture from the transport stream at an address corresponding to the time stamp found in the search.

Playback control unit 37 also sets the PID of a PMT transport packet, the PID of a video transport packet, the video stream_type, the PID of an audio transport packet, the audio stream_type and PCR_PID as the control information of the AV program to be read out next.

The user may also request playback of a selected AV program at a high speed. Playback control unit 37 requests read unit 31 to read out pieces of data of I pictures of the AV program sequentially and continuously, one piece after another, on the basis of the random-access points stored in the transport-stream management table for the AV program. Thus, the I pictures can be found quickly and output, thus providing a high quality picture at high speed. Playback control unit 37 also sets the PID of a video transport packet and the video stream_type as control information of the video stream of the I picture to be read out next.

Therefore, as described above, when a random-access playback operation is requested, the moving-picture playback apparatus reads out and plays back a transport stream on the basis of the previously read out transport-stream management table.

The processing described above can be carried out by hardware and/or software. If software is used, programs constituting the software are installed in a computer from recording media. As an alternative, a variety of such programs may be installed typically in a general-purpose personal computer which is capable of executing a variety of functions.

Recording media for such programs can be package media or media previously embedded in a computer. As shown in FIG. 1, package media may be distributed to users separately from the computer. Examples of the package media include a magnetic disc 26 (which may be a floppy disc), an optical disc 27 (which may be a CD-ROM (Compact Disc Read-Only memory) or a DVD (Digital Versatile Disc)), an optical magnetic disc 28 (which may be an MD (Mini Disc)) and a semiconductor memory 29. Much like the package media, a ROM containing a recorded program or a hard disc can also be used by the user.

In accordance with the invention, an address of a random-access point on a multiplexed data stream is computed; and a data base is generated for associating a computed address with video stream packet identification. The data base is recorded on a recording medium separately from the multiplexed stream. As a result, random access to a predetermined AV program can be made at high speed.

As described herein, random-access point information associated with a random-access point closest to a specified desired playback start position is searched for; and a picture signal of a video stream is played back on the basis of the random-access point information.

It will thus be seen that the objects set forth above, among those made apparent from the preceding description, are efficiently attained and, because certain changes may be made in carrying out the above method and in the construction(s) set forth without departing from the spirit and scope of the invention, it is intended that all matter contained in the above description and shown in the accompanying drawings shall be interpreted as illustrative and not in a limiting sense.

It is also to be understood that the following claims are intended to cover all of the generic and specific features of the invention herein described and all statements of the scope of the invention which, as a matter of language, might be said to fall therebetween.

I claim:

1. A recording apparatus for recording data acquired from a data stream that includes a plurality of packetized programs, each of said plurality of packetized programs having packet identification information, said recording apparatus comprising:
   detection means for detecting at least one random-access point of each of said plurality of packetized programs;
   analyzing means for obtaining an address of said at least one random-access point and for distinguishing packets having said random-access point in accordance with packet identification information included in said plurality of packetized programs;
   data-base creation means for creating a data base including a plurality of tables, each table having addresses for each of said packet identification information, whereby lists of random-access points in the plurality of tables correspond to different packetized programs that are distinguished from each other by the packet identification information; and
   recording means for recording said data base and said data on a recording medium.

2. A method for recording data acquired from a data stream that includes a plurality of packetized programs, each of said plurality of packetized programs having packet identification information, said recording method comprising the steps of:
   detecting at least one random-access point of each of said plurality of packetized programs;
   analyzing an address of each of said random-access point and for distinguishing packets having said random-access point in accordance with packet identification information included in said plurality of packetized programs;
   creating a data base including a plurality of tables, each table_having addresses for each of said packet identification information, whereby lists of random-access points in the plurality of tables correspond to different packetized programs that are distinguished from each other by the packet identification information; and
   recording said data base and said data on a recording medium.

3. A reproducing apparatus for reproducing data from a data stream recorded on a recording medium, said data stream comprising a plurality of packetized programs, each of said plurality of packetized programs having packet identification information, and a random-access information table including a plurality of tables, each table having addresses for each of said packet identification information, stored on said recording medium corresponding to each of said plurality of packetized programs, whereby lists of random access points in the plurality of tables correspond to different packetized programs that are distinguished from each other by said packet identification information, said reproducing apparatus comprising:
   reproducing means for reproducing from said recording medium said plurality of packetized programs and said corresponding random-access information table; and
   control means for controlling, according to said random-access information table, an access point during a random-access playback operation of each of said plurality of packetized programs.

4. A method for reproducing data from a data stream recorded on a recording medium, said data stream comprising a plurality of packetized programs, each of said plurality of packetized programs having packet identification information, and a random-access information table including a plurality of tables, each table having addresses for each of said packet identification information stored on said recording medium corresponding to each of said plurality of packetized programs, whereby lists of random-access points in the plurality of tables correspond to different packetized programs that are distinguished from each other by said packet identification information, said method for reproducing comprising the steps of:
   reproducing from said recording medium said plurality of packetized programs and said corresponding random-access information table; and
   controlling an access point during a random-access playback operation, according to said random-access information table.

5. Data-base creation apparatus for creating a data base for data acquired from a data stream that includes a plurality of packetized programs, each packetized program having packet identification information and each packetized program having at least one random-access point, said apparatus comprising:
   input means for inputting one or more addresses of each of said random-access points derived from said packetized program; and create means for creating said data base, said created data base including a plurality of tables corresponding to said packet identification information, and each table having addresses inputted by said input means, whereby lists of random-access points in the plurality of tables correspond to different packetized programs that are distinguished from each other by the packet identification information.

6. A method of creating a data base for data acquired from a data stream that includes a plurality of packetized programs, each packetized program having packet identification information and each packetized program having at least one random-access point, said method comprising the steps of:

inputting one or more addresses of each of said random-access points derived from said packetized program; and creating said data base, said created data base including a plurality of tables corresponding to said packet identification information, and each table having addresses inputted by said input means, whereby lists of random-access points in the plurality of tables correspond to different packetized programs that are distinguished from each other by the packet identification information.

7. A reproducing device for controlling the reproduction of data from a data stream, said data stream comprising a plurality of packetized programs, each of said plurality of packetized programs having packet identification information, and a random-access information table including a plurality of tables, each table having addresses for each of said packet identification information, corresponding to each of said plurality of packetized programs, whereby lists of random access points in the plurality of tables correspond to different packetized programs that are distinguished from each other by said packet identification information, said reproducing device including:

a controller for controlling, according to said random-access information table, an access point to be reproduced during a random-access playback operation of each of said plurality of packetized programs.

8. A method of controlling the reproduction of data from a data stream, said data stream comprising a plurality of packetized programs, each of said plurality of packetized programs having packet identification information, and a random-access information table including a plurality of tables, each table having addresses for each of said packet identification information, corresponding to each of said plurality of packetized programs, whereby lists of random access points in the plurality of tables correspond to different packetized programs that are distinguished from each other by said packet identification information, said method including the step of controlling, according to said random-access information table, an access point to be reproduced during a random-access playback operation of each of said plurality of packetized programs.

* * * * *